April 12, 1966     J. W. CROSSETT     3,245,351
SEPARABLE CONNECTOR FOR AN INTERSTAGE MISSILE
Filed May 15, 1964
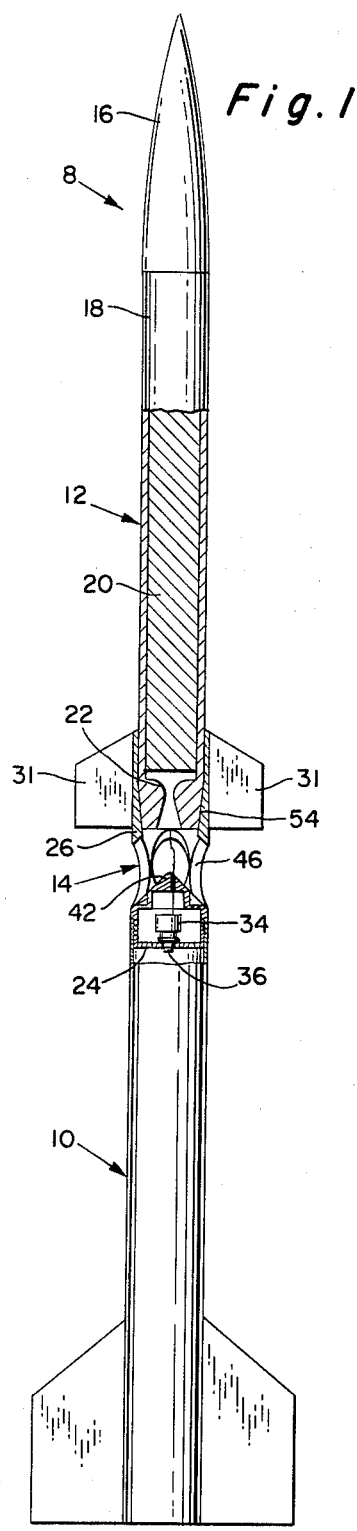
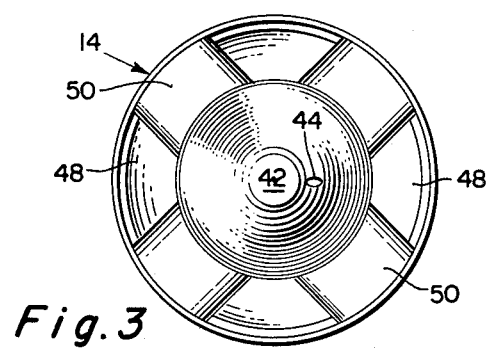
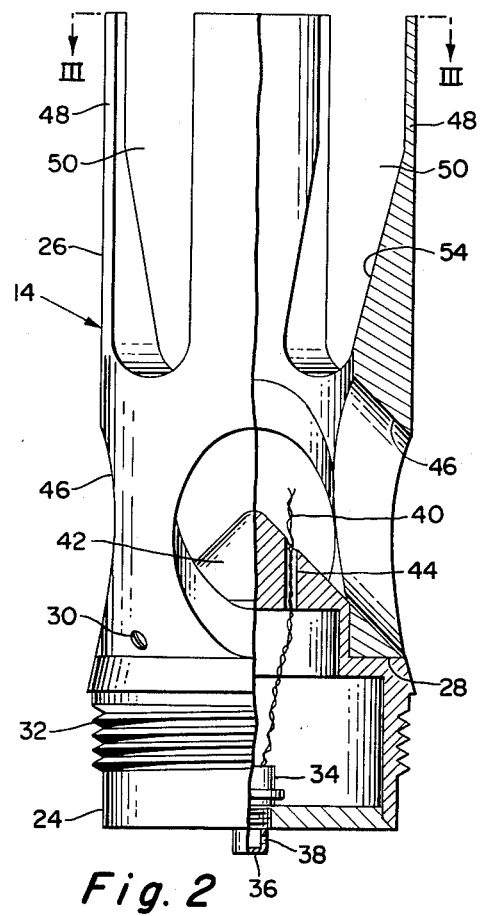
INVENTOR.
JERRY W. CROSSETT
BY
ATTORNEY

United States Patent Office 3,245,351
Patented Apr. 12, 1966

3,245,351
SEPARABLE CONNECTOR FOR AN INTERSTAGE MISSILE
Jerry W. Crossett, Pasadena, Calif., assignor to the United States of America as represented by the Secretary of the Navy
Filed May 15, 1964, Ser. No. 367,902
10 Claims. (Cl. 102—49)

The invention described herein may be manufactured and used by or for the Government of the United States of America for governmental purposes without the payment of any royalties thereon or therefor.

This invention relates to connecting devices, and more specifically to a separable connector for the stages of a multi-stage missile or the like.

The need for sounding rockets for meteorological purposes, scientific space exploration, and military applications has been firmly established. There are no technical difficulties in designing new missile and/or boosters systems to accomplish these objectives if cost is of no primary concern. However, costly and complex missiles systems and boosters for this purpose places an undue restriction on their use unless the particular program can afford the high cost. Since many important scientific programs cannot justify a high missile cost, especially where a substantial number of missiles are involved, there is a real need for an inexpensive missile vehicle capable of carrying a recoverable payload of approximately 15 lbs. to an altitude of approx. 100 miles.

Previous efforts to accomplish this objective have failed because of damage to the probe sustainer rocket motor by overstressing due to the high acceleration forces occurring in the boost phase.

The interstage connector of this invention enables the prior art difficulties to be avoided by enabling the operation of the booster motor and the sustainer motor to occur simultaneously. In this manner, the high thrust of the first stage booster motor, which heretofore has caused overstressing and cracking of the solid propellant grain of the second stage sustainer motor is counteracted by the internal pressure existing in the sustainer motor. For this reason, the interstage connector must be capable of porting the exhaust gases of the second stage motor and to withstand the highly corrosive environment. Simplification of the interstage connector is possible by utilizing the higher thrust forces of the first stage booster motor to keep the motors joined through the interstage connector, and by utilizing the absence of the booster thrust at burn-out to cause separation of the stages. The interstage connector is designed to be self-aligning under the acceleration forces, and rotatably adjustable for alignment with the fins of the forward stage.

An important object of this invention is to provide an adapter for connecting multi-stage rockets, for example, a booster motor rocket to a sustainer motor rocket; and a corollary object is to enable the employment of surplus military rockets as booster rockets for meteorological probe missiles.

Another object is to provide a connecting device that is self-aligning when connecting motor stages, and which device enables the missile stages to be connected solely by acceleration forces.

A further object is to provide an interstage missile connector that will laterally deflect exhaust gases from a forward rocket motor to enable concurrent motor operation of both missile stages.

Still other objects are to provide an interstage missile connector that will form a closure for the aft missile stage and which will also provide an ignition system housing; and to provide an adapter connector which will not interfere with a rail launcher.

Other objects, advantages, and novel features of the invention will become apparent from the following detailed description of the invention when considered in conjunction with the accompanying drawings wherein;

FIG. 1 is an elevation view, partially in section, of an assembled two-stage rocket vehicle employing the novel interstage connector of this invention;

FIG. 2 is an enlarged elevation view, partially in quarter section, of the novel interstage connector.

FIG. 3 is an end view taken along line III—III of FIG. 2.

Referring to the drawing where like reference numerals refer to similar parts throughout the drawing there is shown in FIG. 1 an assembled multi-stage missile vehicle 8 including a first or booster stage 10 and a second or sustainer stage 12 being secured together by the novel interstage adapter connector 14, the latter connector forming the subject matter of the present invention. The second stage missile 12 illustrated may be a meteorological probe one type being known as "Arcas," or any other suitable probe missile. Such a probe will have a nose cone 16 which in a meteorological probe contains the instrument package, a parachute section 18 to provide a recovery system, and a sustainer motor section 20 having a nozzle 22 shown in section.

First stage 10 comprises primarily a booster rocket motor of which several conventional types have been found most satisfactory, namely, the "Sidewinder"; "Zuni" and "Hvar." These booster motors are normally used in weapon systems, and are involved in substantially large production and also being under periodic improvement. These factors cause a surplus of overage or phased-out booster motors that otherwise have limited use. The invention adapter connector 14 enables these booster motors to be mated with a probe missile or the like, and in effect creates a new use for surplus booster motors.

Adapter connector 14 is constructed of steel essentially in two parts, namely a base portion 24, and a sleeve portion 26. Sleeve portion 26 is seated in an annular recess 28 in the base portion and secured therein by a plurality of screws 30, which allows for adjustment of the sleeve to accommodate the second stage fins 31 when the missiles are mated. Base portion 24 is exteriorly threaded at 32 for screwing into the end of the casing of booster motor 10, forming a gas tight end closure therefor. Base portion 24 may be constructed hollow to house a pressure actuated switch 34, which for simplicity and economy can be a conventional automotive brakelight pressure switch. The pressure actuated switch is normally in an "open" position until closed by the existence of a predetermined pressure in the booster motor chamber. Switch 34 is mounted in the end wall of the base portion and has an extension 36 which projects through the end wall into booster motor 10. Extension 36 has a bleed hole 38 for admitting pressure from booster motor 10 to activate switch 34. Firing leads 40 extend from switch 34 to the igniter (not shown) of the sustainer motor 20. By this arrangement sustainer motor 20 of the second stage is not fired until booster motor 10 has ignited and developed a predetermined gas pressure to assure the proper thrust build-up. The forward end of the base member 24 is cone-shaped forming a deflector 42 to deflect the flame and exhaust gases from sustainer motor 20 in a manner to be described. A longitudinally drilled opening 44 accommodates the passage of firing leads 40 to the sustainer motor.

An aft end of adapter sleeve portion 26 adjacent deflector 42 has a plurality of vent openings or ports 46 formed therethrough, four being illustrated, preferably drilled at a 45° angle aft of a normal plane. Vent openings 46 direct and port the exhaust flame from sustainer motor 20 being laterally deflected by deflector cone 42 without the creation of a reverse thrust. As an example, in a 5" outer diameter sleeve 26, four vent openings of 2½ inches in diameter have been found operationally satisfactory. Thus the interstage connector must be capable of withstanding the corrosive action of exhaust of the sustainer motor during the period the motors are connected, as well as being capable of dissipating the exhaust gases evenly around the periphery to prevent unbalanced side thrusts.

The forward end of sleeve 26 has formed a plurality of rigid fingers 48, four being illustrated, spaced apart by slots 50 each to receive one of the four fins 31 of probe missile 12, of which only two are illustrated. The fingers are of sufficient length to provide the necessary support for probe missile 12 and also to prevent relative spin about the longitudinal axis. Obviously, the number of fingers or slots provided will depend on the number of fins on the second stage missile to be accommodated. The inner diameter of sleeve 26 is so dimensioned to receive the boattail of missile 12, as shown in FIG. 1. The base of each finger 48 is tapered at 54 to conform to the tapered end of the boattail to provide a self-aligning feature when the missile is initially subjected to acceleration. Screws 30 enable sleeve 26 to be rotatably adjusted in position to enable the alignment of fins 31 with the corresponding sleeve slots 50.

It is significant to note that there is no physical restraint existing between interstage adapter 14 and probe missile 12 other than the forces due to acceleration. That is, the high thrust of booster motor 10 as compared with the low thrust of the sustainer motor 20 provides the necessary forward force to hold the two motors together through the adapter connector during the boost phase. When the booster motor thrust drops below that of the sustainer motor, approximately at booster motor burnout, the interstage connector allows separation of the stages by the continued acceleration forces of the sustainer motor. In the absence of the booster motor force, the proble missile slips out of adapter connector 14 and continues in flight without the booster motor which is ejected free. The importance of pressure switch 34 becomes readily apparent in preventing premature ignition of sustainer motor 20 until the booster motor 10 has developed a sufficient thrust to keep the interstage connector engaged with the sustainer motor. For this reason it may be desirable to install two pressure switches connected in parallel, to provide increased reliability to the system. In this way, there is assurance that the sustainer motor will not ignite until thrust buildup of the booster, and in the event the booster motor does not ignite upon receiving a firing pulse, the sustainer motor cannot ignite avoiding an aborted flight.

The novel interstage connector makes possible the employment of overage or phased-out booster motors that are in a surplus category providing an inexpensive source of booster motors for scientific probes. Simplicity in construction and a high degree of reliability is achieved by utilizing the acceleration forces during the boost phase to maintain the booster motor and sustainer motor engaged by means of the interstage connector, and automatic separation when the booster motor thrust level falls below that of the sustainer motor. The interstage connector is so designed as to not interfere with the conventional rail launcher used for the launching of high altitude probes.

Obviously many modifications and variations of the present invention are possible in the light of the above teachings. It is therefore to be understood that within the scope of the appended claims the invention may be practiced otherwise than as specifically described.

I claim:

1. In a multistage missile having at least an aft stage booster motor and a forward stage sustainer motor;
said forward stage sustainer motor having a rear end from which propulsive exhaust gases can emerge;
a plurality of radially directed sustainer motor stabilizing fins positioned around said rear end;
an interstage separable connector for connecting said motors assembled together during the boost phase of flight;
said connector having an aft base portion for securing to the booster motor, and a forward portion for releasably supporting the sustainer motor;
said forward portion being slotted at one end to receive the fins of the sustainer motor and forming rigid fingers encompassing an aft portion of said sustainer motor for support thereof;
said connector having means for porting the exhaust flow laterally outwardly evenly around the periphery of the connector;
whereby the sustainer motor and the booster motor can operate simultaneously while in an assembled condition during the boost phase of the flight.

2. In the missile of claim 1 wherein said connector fingers have tapered internal surfaces for engagement with a complementary surface on the sustainer motor for alignment purposes.

3. In the missile of claim 1 wherein the aft base portion and the forward portion of the connector are separate pieces secured together in a manner to permit relative adjustment.

4. In the missile of claim 1 wherein said base portion houses a switch responsive to the pressure in the booster motor for igniting the sustainer motor.

5. In a multistage missile having at least an aft stage booster motor and a forward stage sustainer motor;
said forward stage sustainer motor having a rear end from which propulsive exhaust gases can emerge;
a plurality of radially directed sustainer motor stabilizing fins positioned around said rear end;
an interstage separable connector for connecting said motors assembled together during the boost phase of flight;
said connector having an aft base portion for securing to the booster motor and a forward portion for releasably supprting the sustainer motor;
said base prtion housing a switch responsive to the pressure in the booster motor for igniting the sustainer motor upon a predetermined booster motor thrust;
said connector having means for porting the exhaust flow laterally evenly around the periphery of the connector;
whereby the sustainer motor and the booster motor can operate simultaneously during the boost phase of the flight.

6. In a multistage missile having at least an aft stage booster motor and a forward stage sustainer motor;
said forward stage sustainer motor having a rear end from which propulsive exhaust gases can emerge;
a plurality of radially directed sustainer motor stabilizing fins positioned around said rear end;
an interstage separable connector for connecting said motors assembled together during the boost phase of flight;
said connector having an aft base portion for securing to the booster motor and a forward portion for releasably supporting the sustainer motor;
said forward portion being a sleeve and terminating in a plurality of rigid fingers spaced apart by slots adapted to receive the fins of the sustainer motor, said fingers encompassing an aft portion of said sustainer motor for support thereof;
said sleeve having ports for venting the exhaust flow laterally outwardly and evenly around the periphery of the connector;
whereby the sustainer motor and the booster motor can operate simultaneously while in an assemblled condition during the boost phase of the flight.

7. In the missile of claim 6 wherein said base portion is provided with means for deflecting the exhaust flow from the sustainer motor laterally through the ports.

8. In the missile of claim 6 wherein said deflecting means is a conical end of the base portion of the connector.

9. In a multistage missile having at least an aft stage booster motor and a forward stage sustainer motor;
said forward stage sustainer motor having a rear end from which propulsive exhaust gases can emerge;
a plurality of radially directed sustainer motor stabilizing fins positioned around said rear end;
an interstage separable connector for connecting said motors assembled together during the boost phase of flight;
said connector having an aft base member for securing to the booster motor and a forward member for releasably supporting the sustainer motor;
said base portion housing a switch responsive to the pressure in the booster motor for igniting the sustainer motor upon a predetermined booster motor thrust;
said forward portion being a sleeve terminating in a plurality of rigid fingers spaced apart by slots adapted to receive the fins of the sustainer motor, said fingers encompassing an aft portion of said sustainer motor for support thereof;
said forward member being rotatably adjustable with respect to the base member for aligning the fins of the sustainer motor with the slots in the sleeve;
means for securing the forward member to the base member in the selected position;
said sleeve having a plurality of ports disposed around the periphery for parting the exhaust flow laterally evenly around the periphery of the connector;
whereby the sustainer motor and the booster motor can operate simultaneously while in an assembled condition during the boost phase of the flight.

10. In the missile of claim 1 wherein the axis of the ports form an obtuse angle with the longitudinal axis of the missile.

References Cited by the Examiner

UNITED STATES PATENTS

| 2,899,899 | 8/1959 | Hirsch | 102—49 |
| 2,995,319 | 8/1961 | Kreshner et al. | 102—49 |
| 3,088,403 | 5/1963 | Bartling et al. | 102—49 |
| 3,132,590 | 5/1964 | Hall | 102—49 |

FOREIGN PATENTS

| 572,824 | 3/1959 | Canada. |
| 1,125,143 | 7/1956 | Canada. |

BENJAMIN A. BORCHELT, *Primary Examiner.*

V. R. PENDEGRASS, *Assistant Examiner.*